United States Patent
Lu et al.

(10) Patent No.: US 10,564,733 B2
(45) Date of Patent: Feb. 18, 2020

(54) OPERATING METHOD OF TRACKING SYSTEM, CONTROLLER, TRACKING SYSTEM, AND NON-TRANSITORY COMPUTER READABLE STORAGE MEDIUM

(71) Applicant: HTC Corporation, Taoyuan (TW)

(72) Inventors: Hsin-Yu Lu, Taoyuan (TW); Li-Kang Weng, Taoyuan (TW); Kuang-Yu Pan, Taoyuan (TW); Yuan-Tung Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/954,623

(22) Filed: Apr. 17, 2018

(65) Prior Publication Data

US 2018/0307331 A1 Oct. 25, 2018

Related U.S. Application Data

(60) Provisional application No. 62/488,071, filed on Apr. 21, 2017.

(51) Int. Cl.
*G06F 3/0346* (2013.01)
*G06F 3/038* (2013.01)
*G06F 3/01* (2006.01)

(52) U.S. Cl.
CPC ............ *G06F 3/0346* (2013.01); *G06F 3/011* (2013.01); *G06F 3/038* (2013.01)

(58) Field of Classification Search
CPC ........ G06F 3/011; G06F 3/0346; G06F 3/038; G06T 7/269
See application file for complete search history.

(56) References Cited

U.S. PATENT DOCUMENTS

| | | |
|---|---|---|
| 7,400,782 B2 | 7/2008 | Zhou et al. |
| 8,260,008 B2 | 9/2012 | Hanna et al. |
| 8,456,524 B2 | 6/2013 | Marti et al. |
| 8,868,368 B2 | 10/2014 | Heath |

(Continued)

FOREIGN PATENT DOCUMENTS

| | | |
|---|---|---|
| CN | 1630877 A | 6/2005 |
| CN | 101484933 A | 7/2009 |

(Continued)

OTHER PUBLICATIONS

"GPS Logger for Android", Dec. 20, 2016, Retrieved from the Internet: http://web.archive.org/web/20161220093406/http://www.basicairdata.eu/projects/android/android-gps-logger/.

(Continued)

*Primary Examiner* — Charles V Hicks
(74) *Attorney, Agent, or Firm* — CKC & Partners Co., LLC

(57) ABSTRACT

An operating method of a tracking system includes the following operations: obtaining a first relative movement vector of a client device by first movement detector; obtaining scale information related to distance; calculating a first actual movement vector of the client device according to the first relative movement vector and the scale information; and fusing, by a processor of a host device, the first relative movement vector, the scale information and the first actual movement vector to generate a 3D position of the client device.

16 Claims, 4 Drawing Sheets

(56) References Cited

U.S. PATENT DOCUMENTS

| | | | |
|---|---|---|---|
| 8,976,172 B2* | 3/2015 | Jones | G06T 7/579 |
| | | | 345/419 |
| 2006/0027404 A1 | 2/2006 | Foxlin | |
| 2016/0314574 A1* | 10/2016 | Lee | G06F 16/51 |

FOREIGN PATENT DOCUMENTS

| | | |
|---|---|---|
| CN | 106537290 A | 3/2017 |
| EP | 1089215 A1 | 4/2001 |
| WO | 02052496 A2 | 7/2002 |
| WO | 2007130582 A2 | 11/2007 |

OTHER PUBLICATIONS

Corresponding European search report dated Nov. 21, 2018.
Corresponding Taiwan office action dated Mar. 7, 2019.
Corresponding Chinese office action dated Sep. 29, 2019.

\* cited by examiner

OPERATING METHOD OF TRACKING SYSTEM, CONTROLLER, TRACKING SYSTEM, AND NON-TRANSITORY COMPUTER READABLE STORAGE MEDIUM

RELATED APPLICATIONS

This application claims priority to U.S. Provisional Application Ser. No. 62/488,071, filed Apr. 21, 2017, which is herein incorporated by reference.

BACKGROUND

Technical Field

The present disclosure relates to an operating method of a tracking system, a controller, a tracking system, and a non-transitory computer readable storage medium. More particularly, the present disclosure relates to an operating method of a tracking system, a controller, a tracking system, and a non-transitory computer readable storage medium for determining the actual movement vector of the virtual reality controller.

Description of Related Art

With advances in electronic technology, tracking systems are being increasingly used.

Positioning technology is very important in the VR environment, and accuracy of positioning affects the overall experience of VR users. Therefore, how to position a VR device of a VR system accurately is an important research issue needed to be addressed in the art. However, due to monocular limitation, the value detection of X direction and Y direction is a "scale variant" in respect to the distance on a surface. That is, the change value detected by the camera sensor may not be the actual change value of the client device within the three-dimensional space.

SUMMARY

One aspect of the present disclosure is related to an operating method of a tracking system. The operating method includes the following operations: obtaining a first relative movement vector of a client device; obtaining scale information related to distance; and calculating a first actual movement vector of the client device according to the first relative movement vector and the scale information; and fusing, by a processor of a host device, the first relative movement vector, the scale information and the first actual movement vector to generate a 3D position of the client device.

Another aspect of the present disclosure is related to a controller. The controller includes a first movement detector, a second movement detector, a first depth detector, a second depth detector, and a processor. The first movement detector is configured to obtain a movement vector of the controller on a first virtual plane. The second movement detector configured to obtain a second movement vector of the controller on a second virtual plane. The depth detector is configured to obtain first depth information in respect with the first virtual plane. The second depth detector configured to obtain second depth information in respect with the second virtual plane. The processor is configured to calculate a first actual movement vector of the controller according to the first and second movement vectors and the first and second depth information.

Another aspect of the present disclosure is related to a tracking system. The tracking system includes a client device and a host device. The client device includes a first air mouse and an inertial measurement unit (IMU). The first air mouse is configured to obtain a first movement vector of the client device on a first virtual plane. The inertial measurement unit (IMU) is configured to obtain an IMU movement vector of the client device. The host device includes a processor. The processor is configured to obtain scale information related to distance, to calculate a first actual movement vector of the client device according to the first movement vector, the IMU movement vector and the scale information, and to fuse the first relative movement vector, the scale information and the first actual movement vector to generate a 3D position of the client device.

Another aspect of the present disclosure is related to a non-transitory computer readable storage medium storing one or more programs comprising instructions, which when executed, causes one or more processing components to perform operations includes: receiving a first relative movement vector of a controller on a first virtual plane; receiving scale information related to distance; calculating a first actual movement vector of the controller according to the relative first movement vector and the scale information; and fusing the first relative movement vector, the scale information and the first actual movement vector to generate a 3D position of the controller.

Through the operations of one embodiment described above, the tracking system may retrieve accurate X, Y, Z translation.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
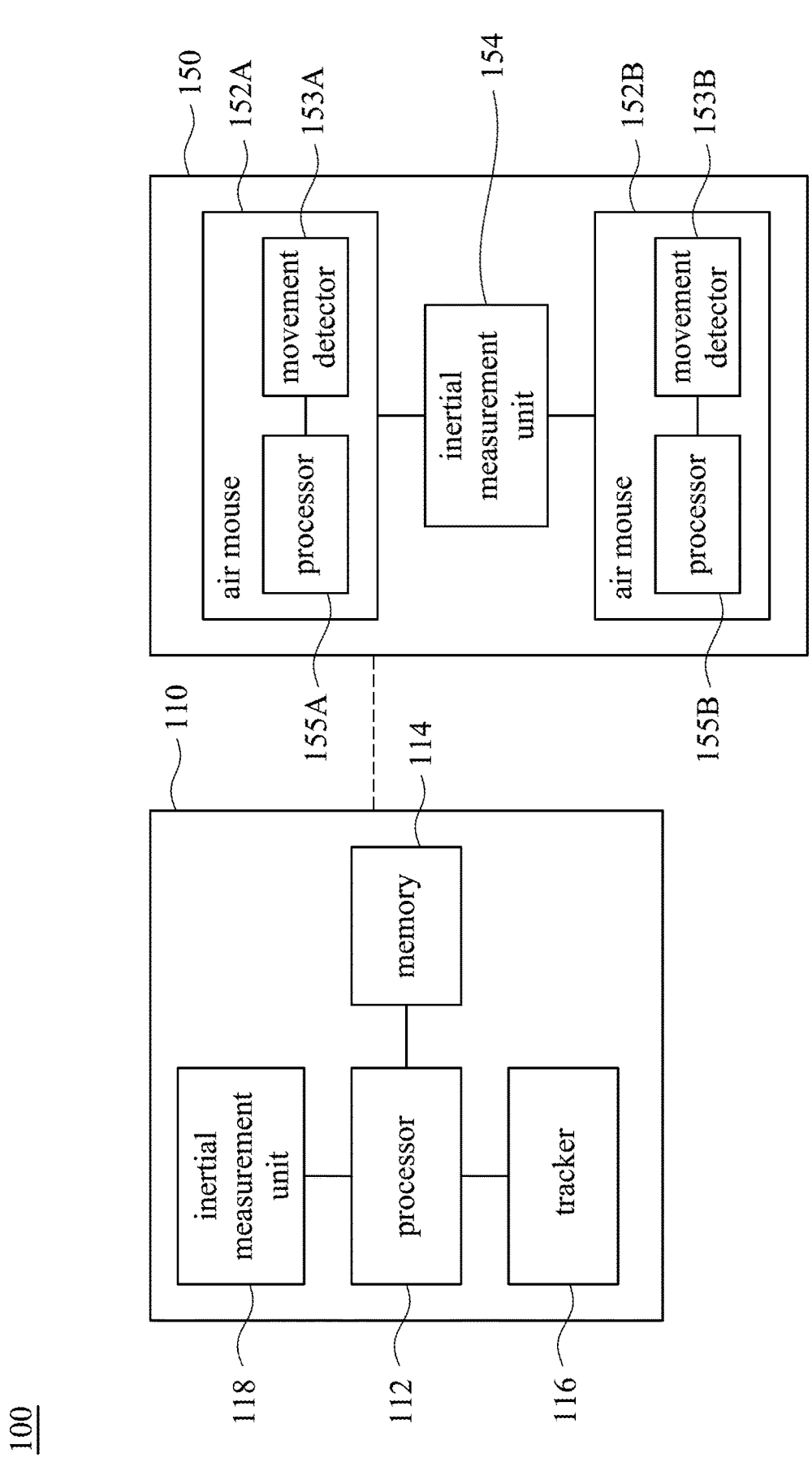
FIG. 1 is a schematic block diagram of a tracking system in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a schematic block diagram of a tracking system 100 in accordance with some embodiments of the present disclosure. As illustrated in FIG. 1, the tracking system 100 includes a host device 110 and a client device 150. The tracking system can be implemented as, for example, virtual reality (VR), augmented reality (AR), mixed reality (MR), or such like environments.

In some embodiments, the host device 110 communicates with the client device 150 via wired or wireless connection, such as Bluetooth, WIFI, USB, and so on.

Reference is made to FIG. 1. In some embodiments, the host device 110 further includes a memory 114. The memory 114 couples to the processor 112. The memory 114 is configured to store a map database of an environment of the tracking system 100. According to the map database and a relative movement vector of the client device 150, the processor 112 is further configured to obtain the 3D position of the client device 150 within the environment.

In some embodiments, the host device 110 includes a tracker 116. The tracker 116 couples to the processor 112. The tracker 116 is configured to obtain object information (e.g., shape, color, pattern or others of object) and establish a 3D environment such as SLAM (Simultaneous Localization And Mapping), so as to determine whether the client device 150 is within the FOV of the host device 110. The processor 112 is further configured to determine whether the client device 150 is within a FOV of the host device 110 or not.

In some embodiments, the host device 110 further includes an inertial measurement unit (IMU) 118. The IMU 118 couples to the processor 112. The IMU 118 is configured to obtain a movement amount and a rotational angular momentum of the host device 110.

In some embodiments, the client device 150 includes air mouses 152A, 152B and an inertial measurement unit (IMU) 154. In some embodiments, the air mouse 152A includes a movement detector 153A and a processor 155A. The air mouse 152B includes a movement detector 153B and a processor 155B. The host device 110 includes a processor 112. On the connection relationship, the IMU 154 couples to the air mouse 152A and the air mouse 152B. The processor 155A couples to the movement detector 153A. The processor 155B couples to the movement detector 153B. In some embodiments, the processors 155A and 155B can be realized by, for example, a digital signal processor (DSP), but there is not limited thereto. For illustrating, the movement detectors 153A, 153B can be realized by camera herein, but it is not limited thereto.

In some embodiments, the air mouse 152A is configured to detect the change value of X direction and Y direction by movement detector 153A using a method called optical flow or the like. Similarly, the air mouse 152B is configured to detect the change value of Y direction and Z direction by movement detector 153B using a method called optical flow or the like. In some embodiments, the X direction, Y direction, and Z direction are perpendicular to each other. In some embodiments, the movement detectors 153A and 153B can be replaced by other components such as Radar, Ultrasonic, laser distance measurer, or etc., there is not limited thereto.

In some embodiments, the movement detector 153A is configured to obtain the movement vector of the client device 150 on a first virtual plane, for example, the XY plane, and the movement detector 153B is configured to obtain a movement vector of the client device 150 on a second virtual plane, which is perpendicular to the first virtual plane, for example, the YZ plane. That is, the movement vector on the XY plane obtained by the movement detector 153A includes a vector in X direction and a vector in Y direction. The movement vector on the YZ plane obtained by the movement detector 153B includes a vector in Y direction and a vector in Z direction. In some embodiments, the X direction, Y direction, and Z direction are perpendicular to each other. In some embodiments, the inertial measurement unit 154 is configured to obtain movement vector from time point t1 to time point t2. In some embodiments, the client device 150 transmits the detected movement vectors of XY plane and/or YZ plane and the movement vector from time point t1 to time point t2 to the host device 110. The processor 112 of the host device 110 obtains a relative movement vector between the host device 110 and the client device 150 according to the detected movement vectors of XY plane and/or YZ plane and the movement vector from time point t1 to time point t2 detected by the IMU 154.

Successively, the processor 112 of the host device 110 further calculates an actual movement vector of the client device 150. In detail, according to the position information related to the client device 150 acquired by the tracker 116, the processor 112 estimates scale information based on the map database. Furthermore, with combination of the scale information, position information obtained related to the client device 150 by the tracker 116, and the map database, the processor 112 of the host device 110 may calculate a 3D position of the client device 150 in the 3D environment.

For example, if the movement vector from time point t1 to time point t2 of the client device 150 on the XY plane obtained by the movement detector 153A is (3, −4). Then, the movement vector from time point t1 to time point t2 detected by the inertial measurement unit 154 is (30, −40, 0). In this case, based on the coordinate of host device 110 and the map database, the processor 112 may obtain that the scale information between the actual movement vector and the relative movement vector is 10 cm/pixel. In next period, if the movement vector from time point t2 to time point t3 of the client device 150 on the XY plane obtained by the movement detector 153A is (−5, 5); the movement vector from time point t2 to time point t3 detected by the inertial measurement unit 154 is (−40, 40, 0). Thus, the processor 112 may obtain that the scale information between the actual movement vector and the relative movement vector is about 8 cm/pixel. However, in different time interval, the scale information shall be recalculated to ensure the 3D position of the client device 150.

In addition, the 3D position consists of 6 degrees of freedom (DoF) matrix (3 translations and 3 orientations). In some embodiments, a 3D position of host device 110 can be directly estimated from the tracker 116 and the IMU 118. The 3D position of the client device 150, which is relative to the 3D position of host device 110, can be obtained by the host device 110 from estimating the scale information by the depth using the map database and the relative movement vector. Thus, the host device 110 finally generates the 3D position of the client device 150 based on the object information acquired by the tracker 116 and the scale information.

Figure 2:
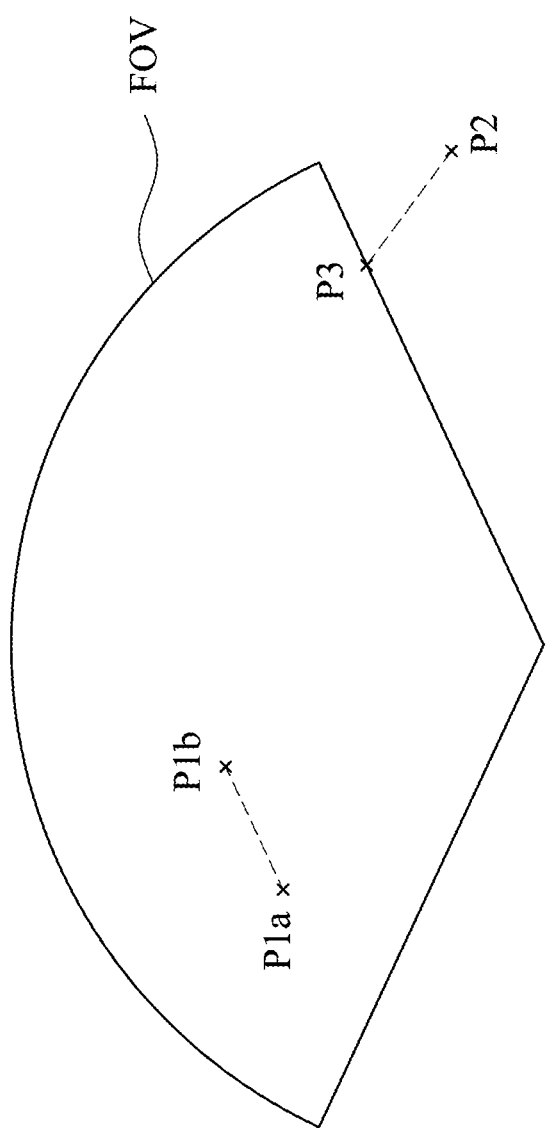
FIG. 2 is a schematic diagram of a field of view in accordance with some embodiments of the present disclosure.

Reference is made to FIG. 2. FIG. 2 is a schematic diagram of a field of view FOV in accordance with some embodiments of the present disclosure. If the client device 150 is at position P1a, the processor 112 determines that the client device 150 is within the FOV of the host device 110. On the other hand, if the client device 150 is at position P2, the processor 112 determines that the client device 150 is not within the FOV of the host device 110.

In some embodiments, the object information includes pictures taken by the tracker 116. For example, the tracker 116 takes pictures to determine whether the client device 150 is within the FOV of the host device 110. That is, if the client device 150 is in the picture that the tracker 116 takes at time point t1, the processor 112 determines that the client device 150 is within the FOV of the host device 110 at time point t1. However, the present disclosure is not limited to the method mentioning above.

Reference is made to FIG. 1 again. If it is determined that the client device 150 is within the FOV of the host device 110, the processor 112 is further configured to update the map database with high confidence and to retrieve the scale information accurately. On the other hand, if it is determined that the client device 150 is not within the FOV of the host device 110, the processor 112 is further configured to determine whether the client device 150 has visited the position before or not.

If it is determined that the client device 150 has visited the position before, the processor 112 is further configured to determine the position of the client device 150 within the environment according to history information of the map database. On the other hand, if it is determined that the client device 150 has never visited the position before, the processor 112 is further configured to update the map database with low confidence.

Reference is made to FIG. 1 and FIG. 2 at the same time. For example, if the client device 150 is at position P1a at time point t1 and it is determined that the client device 150 moves to position P1b at time point t2, since the client device 150 is within the FOV of the host device 110, the processor 112 updates the map database with high confidence and retrieves the scale information accurately. That is, the processor 112 calculates the actual movement vector with high accuracy.

For another example, if the client device 150 is at position P3 at time point t1 and at position P2 at time point t2, since the client device 150 is not within the FOV of the host device 110, the processor 112 determines whether the client device 150 has visited the position P2 before or not. If it is determined that the client device 150 has visited the position P3 before, the processor 112 determines the position of the client device 150 is within the environment according to history information of the map database, since the processor 112 already knows the environment of the position P3. Furthermore, the processor 112 retrieves the history scale information of the position P3 so as to calculate the actual movement vector of the client device 150. That is, the last time that the client device 150 visited the position P3, the memory 114 stores the scale information of the position P3, which may be used as the history scale information of the position P3 when the client device 150 moves outside the FOV to the position P3.

On the other hand, if it is determined that the client device 150 has never visited the position P3 before, the processor 112 updates the map database with low confidence.

Figure 3:
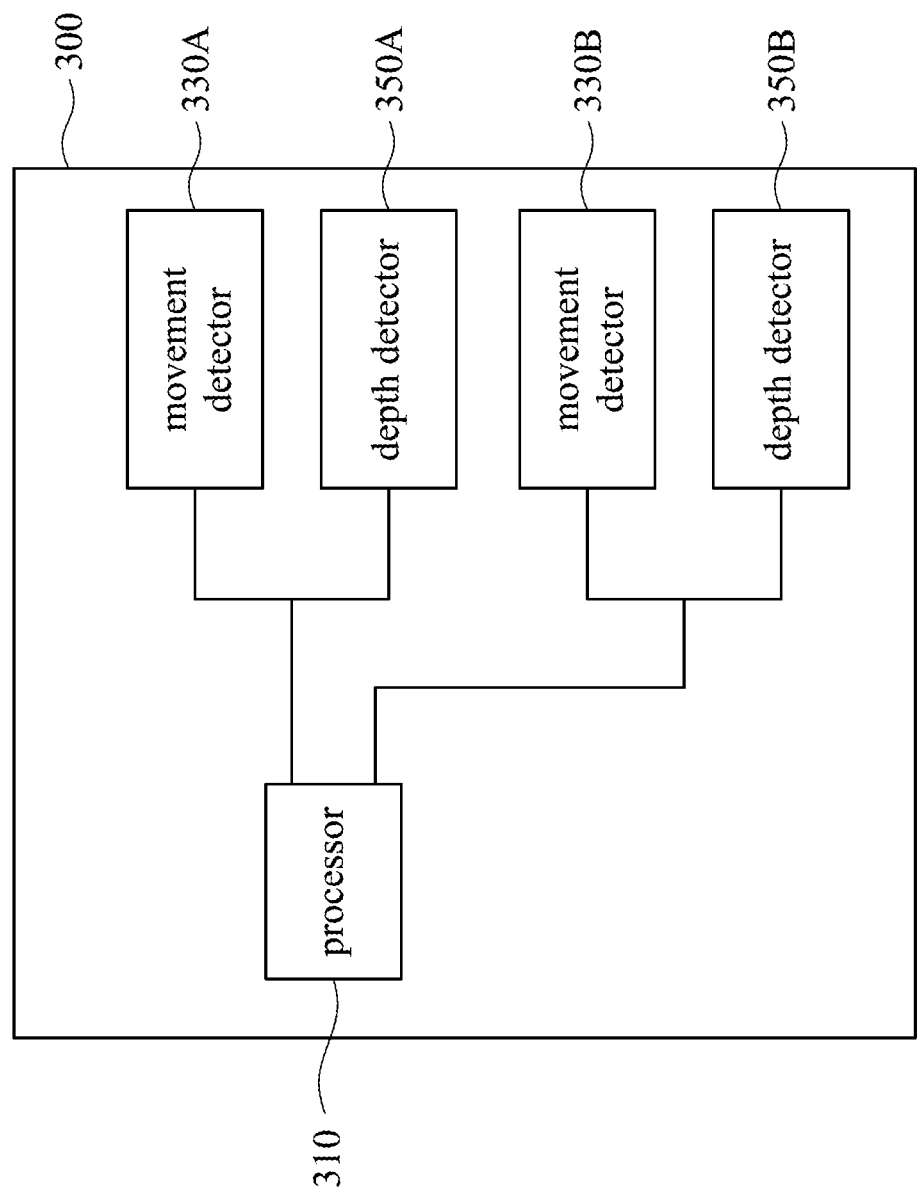
FIG. 3 is a schematic block diagram of a controller in accordance with some embodiments of the present disclosure.

Reference is made to FIG. 3. FIG. 3 is a schematic block diagram of a controller 300 in accordance with some embodiments of the present disclosure. In some embodiments, the controller 300 may be regard as the client device 150 as illustrated in FIG. 1. As illustrated in FIG. 3, the controller 300 includes a processor 310, movement detectors 330A, 330B, and depth detectors 350A, 350B. In the connection relationship, the movement detectors 330A, 330B and the depth detectors 350A, 350B are connected to the processor 310 separately. For illustrating, the movement detectors 330A, 330B can be realized by camera herein, but it is not limited thereto.

In the operation relationship, the movement detector 330A is configured to obtain a movement vector of the controller 300 on a first virtual plane. That is, the movement vector obtained by the movement detector 330A includes a vector in X direction and a vector in Y direction, in which the X direction is perpendicular to the Y direction. The depth detector 350A is configured to obtain depth information in Z direction, which is perpendicular to the first virtual plane.

The movement detector 330B is configured to obtain a movement vector of the controller 300 on a second virtual plane. That is, the movement vector obtained by the movement detector 330B includes a vector in Y direction and a vector in Z direction, in which the Y direction is perpendicular to the Z direction. The depth detector 350B is configured to obtain depth information in X direction, which is perpendicular to the first virtual plane.

With the relative movement vectors of the controller 300 on the XY plane and YZ plane, and the depth information in X direction and Z direction, the processor 310 may calculate the actual movement vector in the 3D environment. In some embodiments, the relative movement vectors and the depth information in X direction and Z direction can be transmitted to the host device 110, so as to obtain the actual movement vector.

In some embodiments, the depth detectors 350A, 350B may be realized by, for example, Ultrasonic unit, Radar, laser distance measurer, or etc., there is not limited thereto. However, the present disclosure is not limited to this.

It should be noted that the ways in which the devices and components in the tracking system 100 and the controller 300 realized are not limited by the embodiments described above. In addition, the connections among these devices and components are not limited by the embodiments described above. Any configuration of these devices and components and interconnections there among that would enable the tracking system 100 and the controller 300 to practice the technical features described below and/or in the claims can be used herein.

Based on the above, the tracking system 100 and the controller 300 in the present disclosure may calculate the actual movement vector of a certain object (for example, the client device 150 or the controller 300) with high accuracy by the scale information between the relative movement vector and the actual movement vector, in which the scale information can be obtained by the depth detectors 350A, 350B or the map database.

Figure 4:
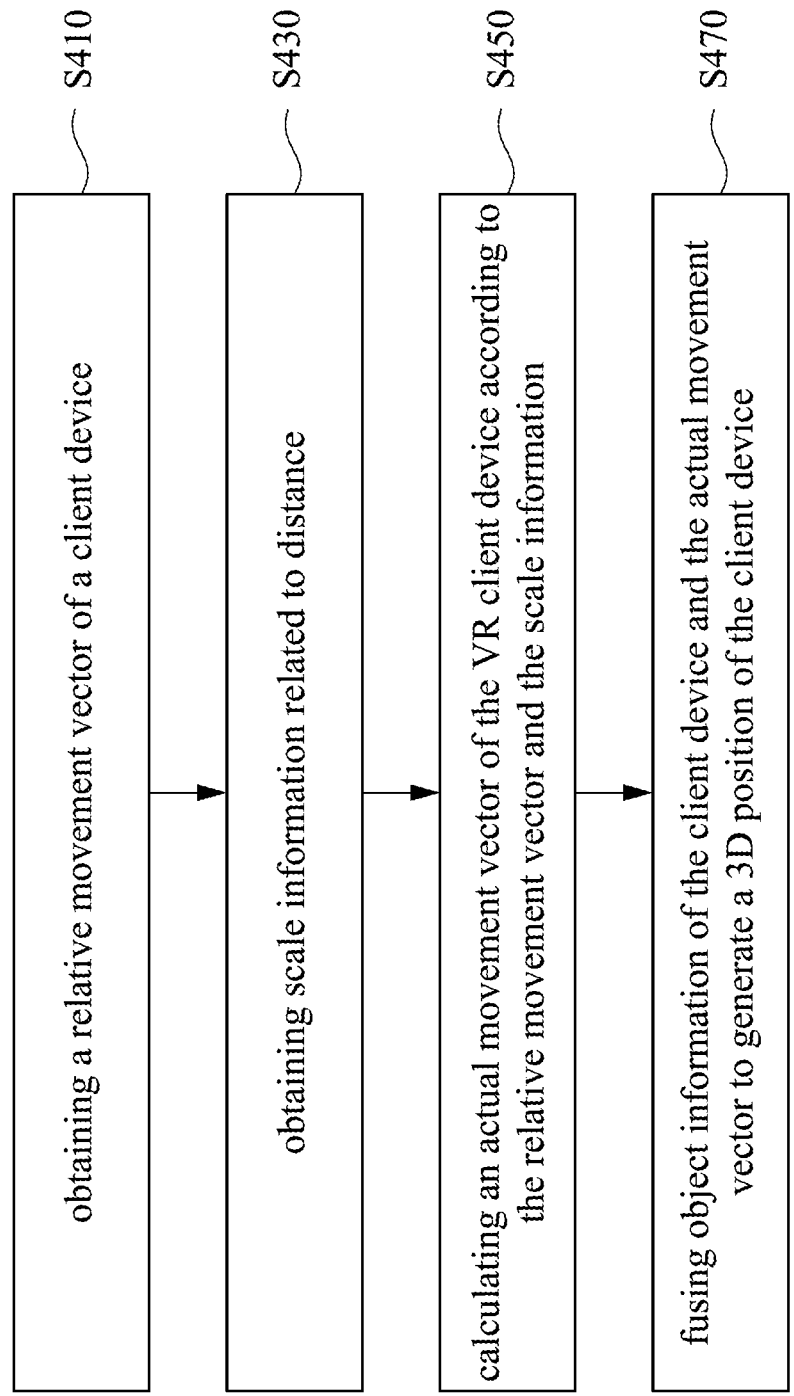
FIG. 4 is a flowchart of an operating method in accordance with some embodiments of the present disclosure.

Reference is made to FIG. 4. FIG. 4 is a flowchart of an operating method 400 in accordance with some embodiments of the present disclosure. However, the present disclosure is not limited to the embodiment below.

It should be noted that the method can be applied to a tracking system or a controller having a structure that is the same as or similar to the structure of the tracking system 100 shown in FIG. 1 or the controller 300 shown in FIG. 3. To simplify the description below, the embodiments shown in FIG. 1 or FIG. 3 will be used as an example to describe the method according to an embodiment of the present disclosure. However, the present disclosure is not limited to application to the embodiments shown in FIG. 1 or FIG. 3.

It should be noted that, in some embodiments, the method may be implemented as a computer program. When the computer program is executed by a computer, an electronic device, or the one or more processor 112, 155 in FIG. 1 or the processor 310 in FIG. 3, this executing device perform the method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following method, no particular sequence is required unless otherwise specified. Moreover, the following operations also may be performed simultaneously or the execution times thereof may at least partially overlap.

Furthermore, the operations of the following method may be added to, replaced, and/or eliminated as appropriate, in accordance with various embodiments of the present disclosure.

Reference is made to FIG. 4. The operating method 400 includes the operations below.

In operation S410, obtaining a relative movement vector of a client device. In some embodiments, the operation S410 may be performed by the movement detector 153A or 153B and the IMU 154 in FIG. 1 or the movement detectors 330A, 330B in FIG. 3. In some embodiments, the relative movement vector obtained in operation S410 includes a vector on the XY plane and a vector on the YZ plane, in which the XY plane is perpendicular to the YZ plane. In some embodiments, operation S410 further includes obtaining a first frame at a first time point, and to obtain a second frame at a second time point, and calculating, according to the first frame and the second frame, the relative movement vector of the client device on a plane, for example, XY plane or YZ plane, based on a time interval between the first time point and the second time point.

For example, the movement detector 153A in FIG. 1 obtains a first frame of the XY plane or YZ plane at a first time point t1 and obtains a second frame of the XY plane or YZ plane at a second time point t2. The movement detector 153A transmits the first frame and the second frame to the processor 155A. The processor 155A calculates, according to the first frame and the second frame, the relative movement vector of the client device 150 on the XY plane or YZ plane based on a time interval between the first time point t1 and the second time point t2.

In another example, the movement detector 330A in FIG. 3 obtains a first frame at a first time point t1 and obtains a second frame at a second time point t2 of the XY plane. The movement detector 330A transmits the first frame and the second frame to the processor 310. The processor 310 calculates, according to the first frame and the second frame, the relative movement vector of the controller 300 on the XY plane based on a time interval between the first time point t1 and the second time point t2. Similarly, the movement detector 330B in FIG. 3 obtains a third frame at the first time point t1 and obtains a fourth frame at the second time point t2 of the YZ plane. The movement detector 330B transmits the third frame and the fourth frame to the processor 310. The processor 310 calculates, according to the third frame and the fourth frame, the relative movement vector of the controller 300 on the YZ plane based on a time interval between the first time point t1 and the second time point t2.

In operation S430, obtaining scale information related to distance. In some embodiments, the scale information may be obtained in accordance with the map database in FIG. 1 or the depth detectors 350A, 350B in FIG. 3. For example, the inertial measurement unit 154 in FIG. 1 further transmits the movement vector between the first time point t1 and the second time point t2 to the processor 112, so that the processor 112 can calculate the scale information between the relative movement vector and the actual movement vector based on the map database. For another example, the depth detectors 350A, 350B in FIG. 3 detects the depth information between the controller 300 and the planes. In some embodiments, the depth detector 350A obtains the depth information of the XY plane and the depth detector 350B obtains the depth information of the YZ plane, in which the XY plane and the YZ plane are perpendicular to each other. Thus, the processor 112 can calculate the scale information according to the relative movement vectors detected by the air mouses 152A and 153B, and the depth information related to the XY plane and the YZ plane.

In operation S450, calculating an actual movement vector of the client device according to the movement vector and the scale information. In some embodiments, the operation S450 may be performed by the processor 112 in FIG. 1 or the processor 310 in FIG. 3. For example, the processor 112 in FIG. 1 calculates the actual movement vector of the client device 150 according to the movement vector obtained by the air mouse 152A, 152B and the scale information obtained by the processor 112. For another example, the processor 310 in FIG. 3 calculates the actual movement vector of the controller 300 according to the relative movement vector obtained by the movement detectors 330A, 330B and the depth information obtained by the depth detectors 350A, 350B.

In operation S470, fusing object information of the client device and the actual movement vector to generate a 3D position of the client device. In some embodiments, the operation S470 may be performed by the processor 112 in FIG. 1. For example, the processor 112 in FIG. 1 fuses object information of the client device 150 acquired by the tracker 116 and the actual movement vector obtained by the processor 112 to generate a 3D position of the client device 150. In detail, with combination of the scale information, the position information obtained related to the client device 150 by the tracker 116, and the map database stored in the memory 114, the processor 112 of the host device 110 calculates a 3D position of the client device 150 in the 3D environment.

For another example, the processor 112 in FIG. 1 fuses the relative movement vector obtained by the movement detector 330A, 330B, the scale information obtained by the depth detector 350A, 350B, and the actual movement vector obtained by the processor 310 to generate a 3D position of the client device 300. In detail, with combination of the scale information, the position information obtained related to the client device 300 by the tracker 116, and the map database stored in the memory 114, the processor 112 of the host device 110 may calculate a 3D position of the client device 300 in the 3D environment.

In some embodiments, the 3D position of the client device 150 or 300, which is relative to the 3D position of host device 110, can be obtained by the host device 110 from estimating the scale information, the map database and the relative movement vector.

In some embodiments, the operating method 400 further includes determining a position of the client device within the environment according to the map database and the actual movement vector. Reference is made to FIG. 1 and FIG. 4 at the same time. In some embodiments, the operation of determining a position of the client device 150 within the environment according to the map database and the actual movement vector includes determining whether the client device 150 is within a FOV of the host device 110 or not. If it is determined that the client device 150 is within the FOV of the host device 110, the processor 112 is further configured to update the map database with high confidence and to retrieve the scale information accurately. On the other hand, if it is determined that the client device 150 is not within the FOV of the host device 110, the processor 112 is further configured to determine whether the client device 150 has visited the position before or not. If it is determined that the client device 150 has visited the position before, the processor 112 is further configured to determine the position of the client device 150 within the environment according to history information of the map database. On the other hand, if it is determined that the client device 150 has never visited the position before, the processor 112 is further configured to update the map database with low confidence.

Details of this method can be ascertained with reference to the paragraphs above, and a description in this regard will not be repeated herein.

Through the operations of the embodiments described above, the tracking system 100 or the controller 300 in the present disclosure may calculate the actual movement vector of a certain object (for example, the client device 150 or the controller 300) with high accuracy.

Although the present invention has been described in considerable detail with reference to certain embodiments thereof, other embodiments are possible. Therefore, the scope of the appended claims should not be limited to the description of the embodiments contained herein.

What is claimed is:

1. An operating method of a tracking system, comprising:
    obtaining a first relative movement vector and a second relative movement vector of a client device;
    obtaining scale information related to distance;
    calculating a first actual movement vector of the client device according to the first relative movement vector and the scale information; and
    fusing, by a processor, object information of the client device and the first actual movement vector to generate a 3D position of the client device;
    wherein the operating method further comprises:
        detecting a first depth information in respect with the first relative movement vector and a second depth information in respect with the second relative movement vector;
        wherein the first depth information in respect with the first relative movement vector is perpendicular to a second depth information in respect with the second relative movement vector;
        wherein the scale information is obtained according to the first relative movement vector, the second relative movement vector, the first depth information, and the second depth information.

2. The operating method as claimed in claim 1, wherein the first relative movement vector comprises a movement vector in respect with a 2D-plane and a movement vector detected by as first inertial measurement unit of the client device.

3. The operating method as claimed in claim 2, wherein the scale information related to distance is obtained based on a map database stored in a memory of a host device.

4. The operating method as claimed in claim 2, wherein calculating the first actual movement vector of the client device according to the first relative movement vector and the scale information comprises:
    obtaining, by a second inertial measurement unit and a tracker, the 3D position of a host device; and
    calculating the first relative movement vector according to the 3D position of the host device and the movement vector.

5. The operating method as claimed in claim 1, further comprising:
    establishing a 3D environment by a tracker of a host device;
    determining whether the client device is within a field of view (FOV) of a host device or not by the processor of the host device according to the 3D environment; and
    updating a map database with high confidence and retrieving the scale information accurately if it is determined that the client device is within the FOV of the host device by the processor.

6. The operating method as claimed in claim 5, wherein determining whether the client device is within the FOV of the host device or not comprises:
    obtaining the object information so as to determine whether the client device is within the FOV of the host device,
    wherein the object information comprises shape, color, and/or pattern of an object.

7. The operating method as claimed in claim 5, further comprising:

determining whether the client device has visited the position before or not if it is determined that the client device is not within the FOV of the host device by the processor;

determining a position of the client device within the environment according to history information of the map database if it is determined that the client device has visited the position by the processor; and updating the map database with low confidence if it is determined that the client device has never visited the position by the processor.

8. A controller, comprising:

a first movement detector configured to obtain a first movement vector of the controller on a first virtual plane;

a second movement detector configured to obtain a second movement vector of the controller on a second virtual plane;

a first depth detector configured to obtain a first depth information in respect with the first virtual plane;

a second depth detector configured to obtain a second depth information in respect with the second virtual plane; and a processor configured to calculate a first actual movement vector of the controller according to the first and second movement vectors and the first and second depth information.

9. A tracking system, comprising:

a client device, comprising:

a first air mouse configured to obtain a first movement vector of the client device on a first virtual plane;

a second air mouse configured to obtain a second movement vector of the client device on a second virtual plane, wherein the second virtual plane is perpendicular to the first virtual plane;

an inertial measurement unit (IMU) configured to obtain a IMU movement vector of the client device; and a host device, comprising:

a processor configured to obtain scale information related to distance, to calculate a first actual movement vector of the client device according to the first movement vector, the IMU movement vector and the scale information, and to fuse object information of the client device and the first actual movement vector to generate a 3D position of the client device, wherein the processor of the host device is further configured to calculate a second actual movement vector of the client device on the second virtual plane according to the second movement vector, the IMU movement vector and the scale information, and to fuse the first movement vector, the second movement vector, the scale information, the first actual movement vector, and the second actual movement vector to generate the 3D position of the client device.

10. The tracking system as claimed in claim 9, wherein the host device further comprises:

a memory configured to store a map database of an environment of the tracking system;

wherein the processor is further configured to determine a position of the client device within a 3D environment according to the map database and the first actual movement vector.

11. The tracking system as claimed in claim 10, wherein the processor is further configured to establish the 3D environment by a tracker of the host device, to determine whether the client device is within a field of view (FOV) of the host device or not according to the 3D environment, and if it is determined that the client device is within the FOV of the host device, the processor is further configured to update the map database with high confidence and to retrieve the scale information accurately.

12. The tracking system as claimed in claim 11, wherein the host device further comprises:

a tracker configured to obtain the object information so as to determine whether the client device is within the FOV of the host device or not.

13. The tracking system as claimed in claim 12, wherein the object information comprises shape, color, and/or pattern of an object.

14. The tracking system as claimed in claim 11, wherein if it is determined that the client device is not within the FOV of the host device, the processor is further configured to determine whether the client device has visited the position before or not, and if it is determined that the client device has visited the position before, the processor is further configured to determine the position of the client device within the environment according to history information of the map database.

15. The tracking system as claimed in claim 14, wherein if it is determined that the client device has never visited the position, the processor is further configured to update the map database with low confidence.

16. A non-transitory computer readable storage medium storing one or more programs comprising instructions, which when executed, causes one or more processing components to perform operations comprising:

receiving a first relative movement vector and a second relative movement vector of a controller;

receiving scale information related to distance;

calculating a first actual movement vector of the controller according to the first relative movement vector and the scale information; and fusing the first relative movement vector, the scale information and the first actual movement vector to generate a 3D position of the controller wherein the operations further comprises:

detecting a first depth information in respect with the first relative movement vector and a second depth information in respect with the second relative movement vector;

wherein the first depth information in respect with the first relative movement vector is perpendicular to a second depth information in respect with the second relative movement vector;

wherein the scale information is obtained according to the first relative movement vector, the second relative movement vector, the first depth information, and the second depth information.

* * * * *